(12) United States Patent
Xiong et al.

(10) Patent No.: US 11,420,694 B2
(45) Date of Patent: Aug. 23, 2022

(54) ROBOT GAIT PLANNING METHOD AND ROBOT WITH THE SAME

(71) Applicant: UBTECH ROBOTICS CORP LTD, Shenzhen (CN)

(72) Inventors: Youjun Xiong, Shenzhen (CN);
Chunyu Chen, Shenzhen (CN);
Yizhang Liu, Shenzhen (CN); Ligang Ge, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 431 days.

(21) Appl. No.: 16/452,532

(22) Filed: Jun. 26, 2019

(65) Prior Publication Data

US 2020/0156721 A1 May 21, 2020

(30) Foreign Application Priority Data

Nov. 21, 2018 (CN) .......................... 201811388962.3

(51) Int. Cl.
*B62D 57/032* (2006.01)
(52) U.S. Cl.
CPC .................................. *B62D 57/032* (2013.01)
(58) Field of Classification Search
None
See application file for complete search history.

(56) References Cited

U.S. PATENT DOCUMENTS

2005/0075755 A1\* 4/2005 Takenaka ............. B62D 57/032
700/245

OTHER PUBLICATIONS

Hyon et al., Full-Body Compliant Human-Humanoid Interaction: Balancing in the Presence of Unknown External Forces, Oct. 2007, IEEE Transactions on Robotics, vol. 23, No. 5 (Year: 2007).\*
Martinez et al., Experimental Robot Model Adjustments Based on Force-Torque Sensor Information, Mar. 2018, MDPI, Journal, Sensors (Year: 2018).\*

\* cited by examiner

*Primary Examiner* — Christian Chace
*Assistant Examiner* — Katherine Marie Fitzharris

(57) ABSTRACT

The present disclosure provides a robot gait planning method and a robot with the same. The method includes: obtaining, through the sensor set, force information of feet of the robot under a force applied by a target object; calculating coordinates of zero moment points of the feet of the robot with respect to a centroid of a body of the robot based on the force information; and determining a gait planning result for the robot based on the coordinates of the zero moment points with respect to the centroid of the body. The present disclosure is capable of converting the force of the target object to the zero moment points, and using the zero moment points to perform the gait planning, so that the robot follows the target object in the case that the robot is subjected to a force of the target object.

18 Claims, 7 Drawing Sheets

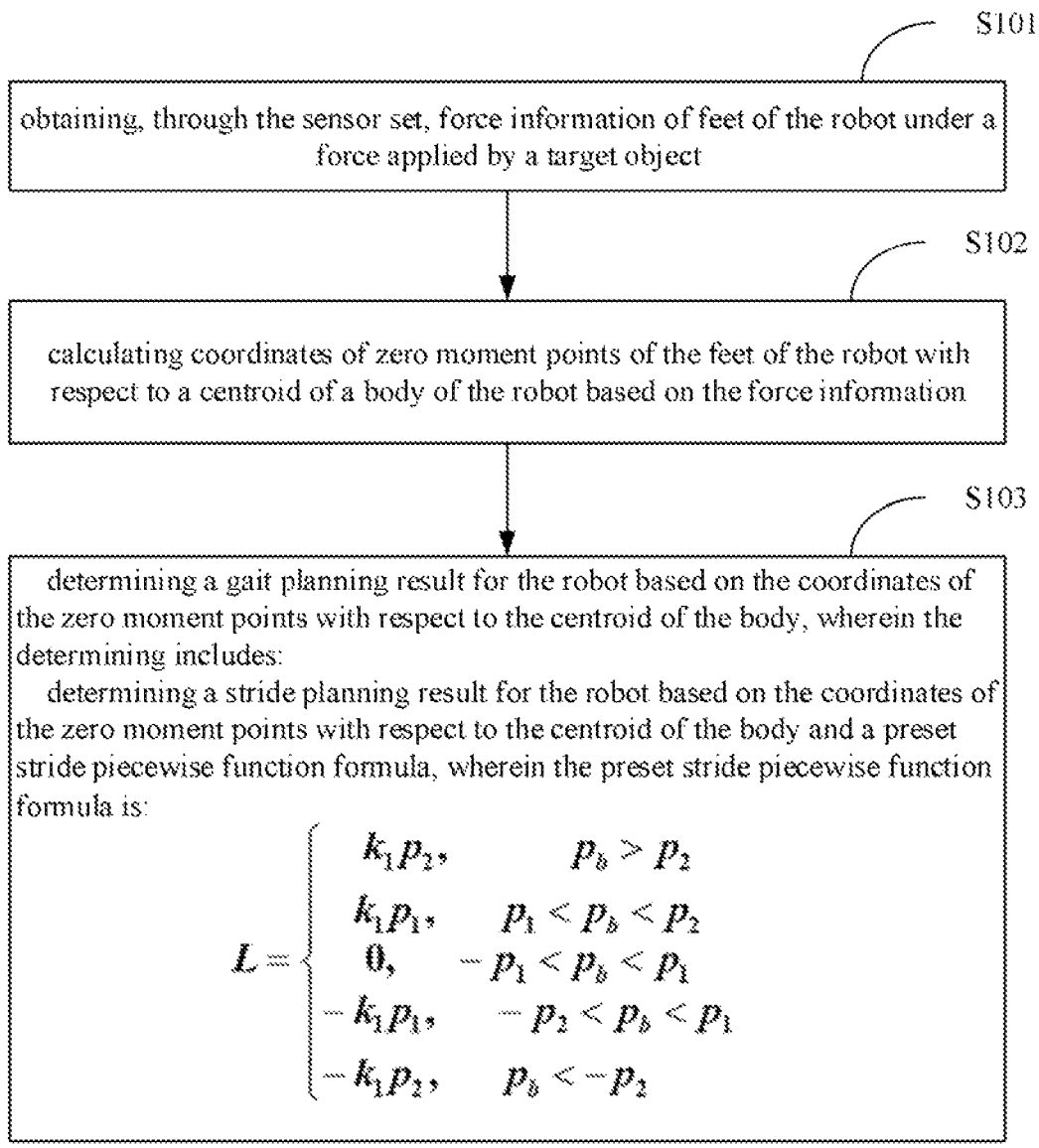

S101
obtaining, through the sensor set, force information of feet of the robot under a force applied by a target object S102
calculating coordinates of zero moment points of the feet of the robot with respect to a centroid of a body of the robot based on the force information S103
determining a gait planning result for the robot based on the coordinates of the zero moment points with respect to the centroid of the body, wherein the determining includes:
determining a stride planning result for the robot based on the coordinates of the zero moment points with respect to the centroid of the body and a preset stride piecewise function formula, wherein the preset stride piecewise function formula is:

$$L = \begin{cases} k_1 p_2, & p_b > p_2 \\ k_1 p_1, & p_1 < p_b < p_2 \\ 0, & -p_1 < p_b < p_1 \\ -k_1 p_1, & -p_2 < p_b < -p_1 \\ -k_1 p_2, & p_b < -p_2 \end{cases}$$

FIG. 1 calculating the coordinate of the zero moment point corresponding to the left foot based on a distance between the first sensor and a sole of the left foot, the left foot force information, and a first formula, where the first formula is:

$$p_l = \begin{bmatrix} p_{lx} & p_{ly} & 0 \end{bmatrix}^T ;$$

where $p_{lx} = (-\tau_{ly} - f_{lx}d_l)/f_{lz}$, $p_{ly} = (-\tau_{lx} - f_{ly}d_l)/f_{lz}$

— S501 calculating the coordinate of the zero moment point corresponding to the right foot based on a distance between the second sensor and a sole of the right foot, the right foot force information, and a second formula, where the second formula is:

$$p_r = \begin{bmatrix} p_{rx} & p_{ry} & 0 \end{bmatrix}^T ;$$

where $p_{rx} = (-\tau_{ry} - f_{rx}d_r)/f_{rz}$, $p_{ry} = (-\tau_{rx} - f_{ry}d_r)/f_{rz}$

— S502 calculating the coordinates of the zero moment points of the feet of the robot with respect to the centroid of the body of the robot based on the relative position information of the centroid of the body and the first sensor, the relative the position information of the centroid of the body and the second sensor, the coordinate of the zero moment point corresponding to the left foot, the coordinate of the zero moment point corresponding to the right foot, and a third formula, where the third formula is:

$$p_b = \begin{bmatrix} p_{bx} & p_{by} & 0 \end{bmatrix}^T ;$$

where $$p_{bx} = \frac{(p_{rx} - l_x)f_{rz} + (p_{lx} - l_x)f_{lz}}{f_{rz} + f_{lz}} \quad p_{by} = \frac{(p_{ry} - l_y)f_{rz} + (p_{ly} - l_y)f_{lz}}{f_{rz} + f_{lz}}$$

$l_j = \begin{bmatrix} l_{lx} & l_{ly} & l_{lz} \end{bmatrix}^T$ is the relative position information of the centroid of the body and the first sensor, $l_r = \begin{bmatrix} l_{rx} & l_{ry} & l_{rz} \end{bmatrix}^T$ is the relative the position information of the centroid of the body and the second sensor

ROBOT GAIT PLANNING METHOD AND ROBOT WITH THE SAME

CROSS REFERENCE TO RELATED APPLICATIONS

This application claims priority to Chinese Patent Application No. CN201811388962.3, filed Nov. 21, 2018, which is hereby incorporated by reference herein as if set forth in its entirety.

BACKGROUND

1. Technical Field

The present disclosure relates to robot technology, and particularly to a robot gait planning method and a robot with the same.

2. Description of Related Art

The interaction between a humanoid robot and a target object (e.g., a human or an animal) is a key point of the researches for humanoid robot technology. However, at present, the robot cannot follow the target object in the case that the robot is subjected to a force of the target object. For example, in the case that the humanoid robot and a human hold the hands, if the human walks at this time, the humanoid robot cannot follow the human to walk.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

FIG. 1 is a flow chart of an embodiment of a robot gait planning method according to the present disclosure.

FIG. 5 is a flow chart of calculating a coordinate of a zero moment point of feet of a robot with respect to a centroid of a body of a robot in the robot gait planning method according to the embodiment of FIG. 1.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

FIG. 1 is a flow chart of an embodiment of a robot gait planning method according to the present disclosure. In this embodiment, a gait planning method for a robot having a sensor set is provided. The method is a computer-implemented method executable for a processor, which may be implemented through and applied to a gait planning apparatus shown in FIG. 6 that is for a robot having a sensor set or a robot shown in FIG. 7 that has a sensor set, or implemented through a storage medium. The robot may be a foot-type robot such as a biped humanoid robot or a four-legged imitation animal robot. The sensor set may include six-dimensional force sensors or other type of sensors capable of detecting forces and/or torques. As shown in FIG. 1, the method includes the following steps.

S101: obtaining, through the sensor set, force information of feet of the robot under a force applied by a target object.

In this embodiment, the robot is a biped humanoid robot having the feet of a left foot and a right foot. The target object may be a human, an animal, or other movable object. The force of the target object which is applied to the robot may be a pull force, a drag force, a push force, or the like, which is not limited herein. The force information of the feet when the robot is subjected to the force applied by the target object can be detected through the sensor set for detecting the force and/or the torque which is disposed on the robot.

Figure 2:
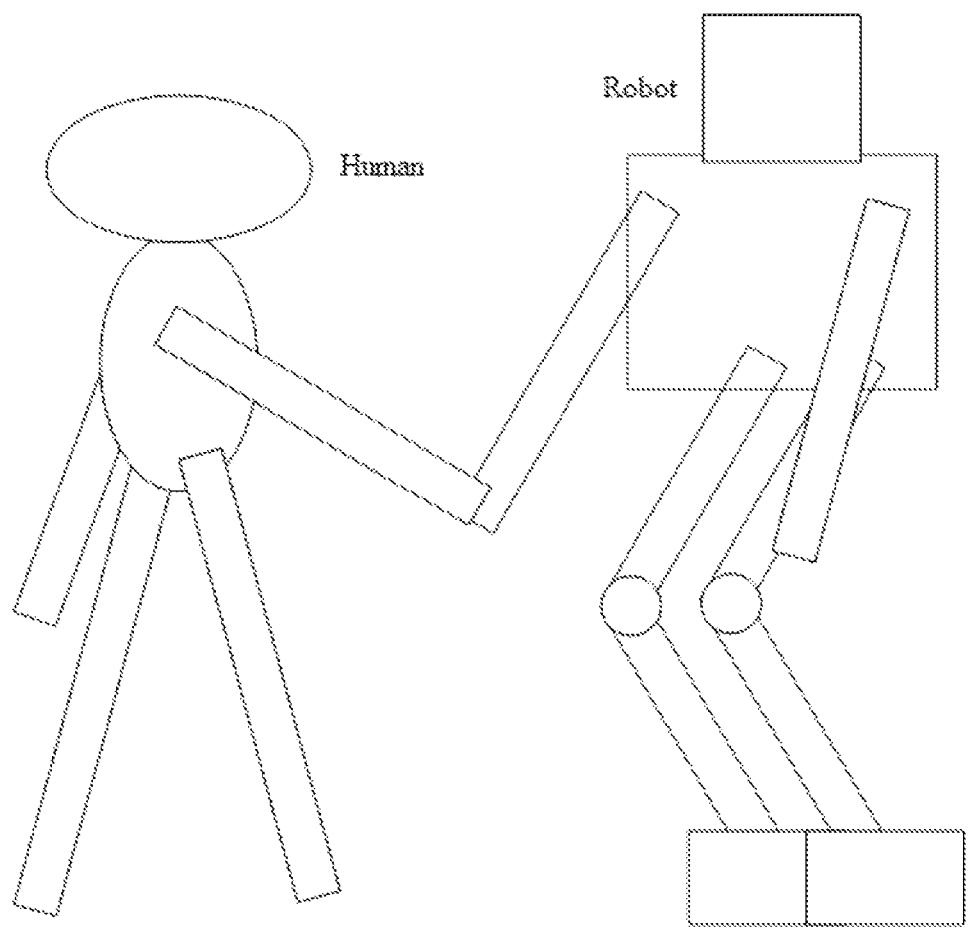
FIG. 2 is a schematic diagram of a humanoid robot following the dragging of a human according to the embodiment of FIG. 1.

For convenience of explanation, the following takes an example of a biped humanoid robot following a human to walk because of the drag of the human, while which is not limited thereto. FIG. 2 is a schematic diagram of a humanoid robot following the dragging of a human according to the embodiment of FIG. 1. As shown in FIG. 2, by the dragging of a human, a biped humanoid robot can follow the human to walk.

Optionally, it may obtain, through six-dimensional force sensors, the force information of the feet of the robot under the force applied by the target object. In which, the sensor set includes the six-dimensional force sensors, and the six-dimensional force sensor are disposed at the feet of the robot.

Figure 3:
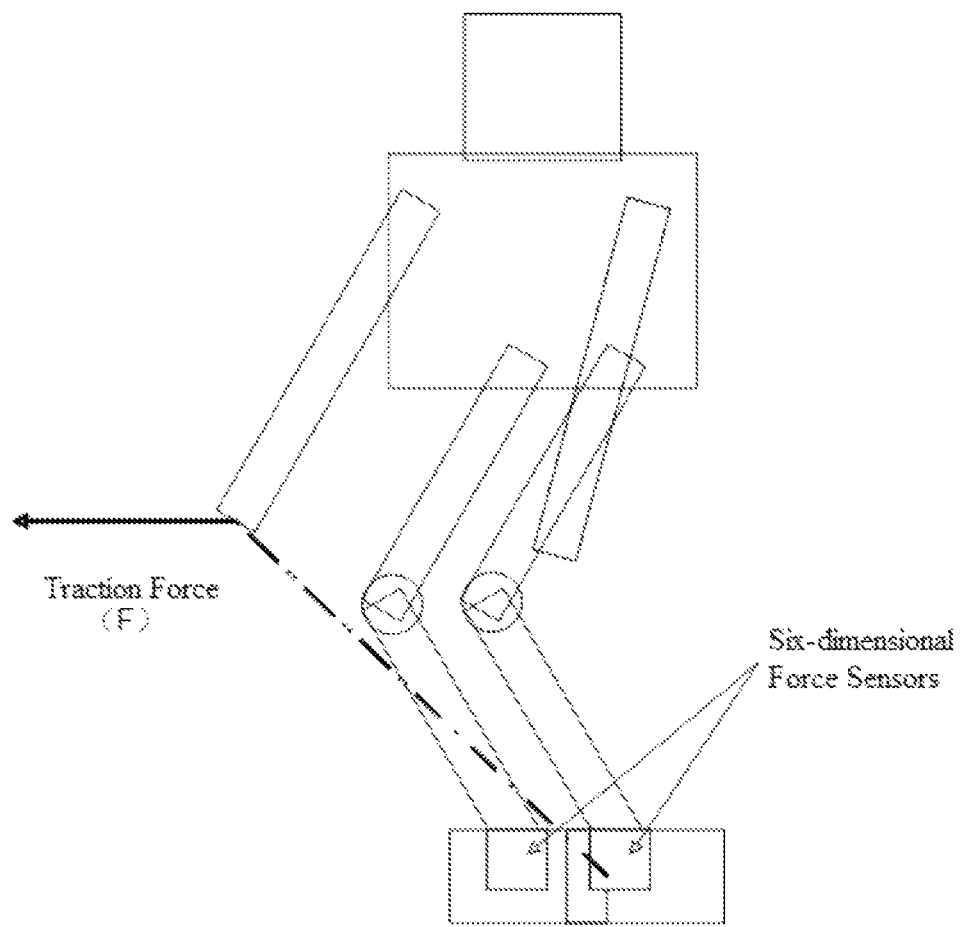
FIG. 3 is a schematic diagram of the disposition of sensors at feet of a humanoid robot according to the embodiment of FIG. 1.
Figure 4:
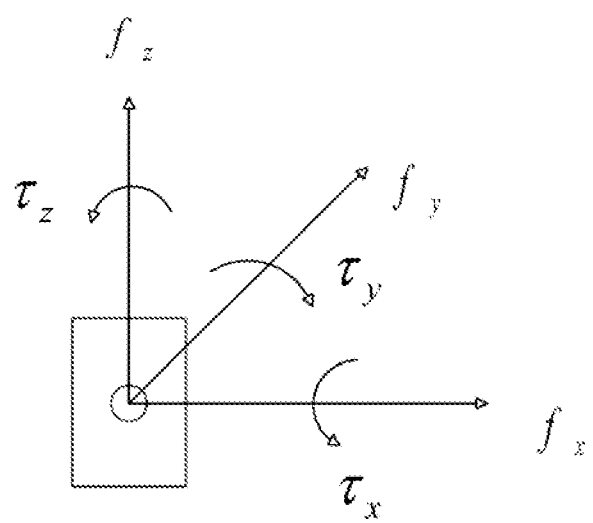
FIG. 4 is a schematic diagram of force information detected by a six-dimensional force sensor according to the embodiment of FIG. 1.

In this embodiment, the force information of the feet when the robot is subjected to the force applied by the target object can be obtained through the six-dimensional force sensors disposed on the feet of the robot. When the human holds the hand of the humanoid robot to apply a force on it, a force such as a drag force will be generated on the robot. In order to accurately detect the drag force of the human with respect to the robot, the six-dimensional force sensors are installed on each of the feet of the humanoid robot, which has an arrangement manner as shown in FIG. 3. FIG. 3 is a schematic diagram of the disposition of sensors at feet of a humanoid robot according to the embodiment of FIG. 1. As shown in FIG. 3, the six-dimensional force sensors are for detecting the force applied on a sole of the foot of the humanoid robot, and the detected force information is as shown in FIG. 4. FIG. 4 is a schematic diagram of force information detected by a six-dimensional force sensor according to the embodiment of FIG. 1. As shown in FIG.

3, the direction of the coordinate axis can be determined according to the actual scene. For example, a plane formed by the x-axis and the y-axis can be parallel to a plane of the sole, and the z-axis is perpendicular to the plane of the sole.

For the humanoid robot, the force information detected by the six-dimensional force sensor of the left foot can be expressed as $F_l=[f_{lx}\ f_{ly}\ f_{lz}\ \tau_{lx}\ \tau_{ly}\ \tau_{lz}]^T$, where $f_{lx}$, $f_{ly}$, and $f_{lz}$, are respectively the force of the directions of the three coordinate axes in the force information of the left foot, $\tau_{lx}$, $\tau_{ly}$, and $\tau_{lz}$ are respectively the torque corresponding to the directions of the three coordinate axes in the force information of the left foot; and the force information detected by the six-dimensional force sensor of the right foot can be expressed as $F_r=[f_{rx}\ f_{ry}\ f_{rz}\ \tau_{rx}\ \tau_{ry}\ \tau_{rz}]^T$, where $f_{rx}$, $f_{ry}$, and $f_{rz}$, are respectively the force of the directions of the three coordinate axes in the force information of the right foot, $\tau_{rx}$, $\tau_{ry}$, and $\tau_{rz}$ are respectively the torque corresponding to the directions of the three coordinate axes in the force information of the right foot.

S102: calculating coordinates of zero moment points of the feet of the robot with respect to a centroid of a body of the robot based on the force information.

In this embodiment, the coordinates of the feet of the robot with respect to the zero moment points (ZMPs) of the centroid of the body can be calculated based on the force information of the feet of the robot. In which, the centroid of the body is a preset center point of the quality of the robot, which can be used as a reference point in a gait planning. For example, it may choose a point according to the structure of the robot to take as the centroid of the body of the robot. The centroid of the body may be on the robot or outside the robot, which is not limited herein.

In one embodiment, the sensor includes a first sensor disposed at the left foot of the robot and a second sensor disposed at the right foot of the robot. The force information includes left foot force information and right foot force information. FIG. 5 is a flow chart of calculating a coordinate of a zero moment point of feet of a robot with respect to a centroid of a body of a robot in the robot gait planning method according to the embodiment of FIG. 1. As shown in FIG. 5, step S102 may include:

S501: calculating the coordinate of the zero moment point corresponding to the left foot based on a distance between the first sensor and a sole of the left foot and the left foot force information.

In this embodiment, the distance between the position of the first sensor and the sole of the left foot can be obtained, and the coordinate of the zero moment point corresponding to the left foot can be calculated based on the distance and the left foot force information.

In one embodiment, it can calculate the coordinate of the zero moment point corresponding to the left foot based on the distance between the first sensor and the sole of the left foot, the left foot force information, and a first formula, where the first formula is:

$$p_l=[p_{lx}\ p_{ly}\ 0]^T; \quad (1)$$

where, $p_l$ is the coordinate of the zero moment point corresponding to the left foot, $p_{lx}=(-\tau_{ly}-f_{lx}d_l)/f_{lz}$, $p_{ly}=(-\tau_{lx}-f_{ly}d_l)/f_{lz}$, $d_l$ is the distance between the first sensor and the sole of the left foot, $f_{lx}$, $f_{ly}$, and $f_{lz}$ are respectively the force of the directions of the three coordinate axes in the left foot force information, $\tau_{lx}$ is the torque corresponding to the direction of the x-axis in the left foot force information, and $\tau_{ly}$ is the torque corresponding to the direction of the y-axis in the left foot force information.

In this embodiment, the coordinate of the zero moment point corresponding to the left foot can be accurately calculated through the distance between the first sensor and the sole of the left foot, the left foot force information, and the first formula.

S502: calculating the coordinate of the zero moment point corresponding to the right foot based on a distance between the second sensor and a sole of the right foot and the right foot force information.

In this embodiment, the distance between the position of the second sensor and the sole of the right foot can be obtained, and the coordinate of the zero moment point corresponding to the right foot can be calculated based on the distance and the right foot force information.

In one embodiment, it can calculate the coordinate of the zero moment point corresponding to the right foot based on the distance between the second sensor and the sole of the right foot, the right foot force information, and a second formula, where the second formula is:

$$p_r=[p_{rx}\ p_{ry}\ 0]^T; \quad (2)$$

where, $p_r$ is the coordinate of the zero moment point corresponding to the right foot $p_{rx}=(-\tau_{ry}-f_{rx}d_r)/f_{rz}$, $p_{ry}=(-\tau_{rx}-f_{ry}d_r)/f_{rz}$, $d_r$ is the distance between the second sensor and the sole of the right foot, $f_{rx}$, $f_{ry}$, and $f_{rz}$ are respectively the force of the directions of the three coordinate axes in the right foot force information, $\tau_{rx}$ is the torque corresponding to the direction of the x-axis in the right foot force information, and $\tau_{ry}$ is the torque corresponding to the direction of the y-axis in the right foot force information.

In this embodiment, the coordinate of the zero moment point corresponding to the right foot can be accurately calculated through the distance between the second sensor and the sole of the right foot, the right foot force information, and the second formula.

S503: calculating the coordinates of the zero moment points of the feet of the robot with respect to the centroid of the body of the robot based on relative position information of the centroid of the body and the first sensor, relative position information of the centroid of the body and the second sensor, the coordinate of the zero moment point corresponding to the left foot, and the coordinate of the zero moment point corresponding to the right foot.

In this embodiment, it can obtain the position information of the centroid of the body of the robot, the position information of the first sensor, and the position information of the second sensor, obtain the relative position information of the centroid of the body and the first sensor based on the position information of the centroid of the body of the robot and the position information of the first sensor, and obtain the relative position information of the centroid of the body and the second sensor based on the position information of the centroid of the body of the robot and the position information of the second sensor.

In one embodiment, it can calculate the coordinates of the zero moment points of the feet of the robot with respect to the centroid of the body of the robot based on the relative position information of the centroid of the body and the first sensor, the relative the position information of the centroid of the body and the second sensor, the coordinate of the zero moment point corresponding to the left foot, the coordinate of the zero moment point corresponding to the right foot, and a third formula, where the third formula is:

$$p_b=[p_{bx}\ p_{by}\ 0]^T; \quad (3)$$

where, $p_b$ is the coordinates of the zero moment points of the feet of the robot with respect to the centroid of the body of the robot, $$p_{bx} = \frac{(p_{rx} - l_x)f_{rz} + (p_{lx} - l_x)f_{lz}}{f_{rz} + f_{lz}}, \quad p_{by} = \frac{(p_{ry} - l_y)f_{rz} + (p_{ly} - l_y)f_{lz}}{f_{rz} + f_{lz}},$$

$l_l = [l_{lx}\ l_{ly}\ l_{lz}]^T$ is the relative position information of the centroid of the body and the first sensor, $l_r = [l_{rx}\ l_{ry}\ l_{rz}]^T$ is the relative the position information of the centroid of the body and the second sensor, $p_r = [p_{rx}\ p_{ry}\ 0]^T$ or is the coordinate of the zero moment point corresponding to the right foot, and $p_l = [p_{lx}\ p_{ly}\ 0]^T$ is the coordinate of the zero moment point corresponding to the left foot, $f_{rz}$ is the force of the z-axis direction in the right foot force information, and $f_{lz}$ is the force of the z-axis direction in the left foot force information.

In this embodiment, in order to realize the gait planning of the robot by detecting the change of the ZMPs, a calculation method of the ZMPs of the feet of the robot with respect to the centroid of the body is proposed, which can plan the gait of the robot based on the calculated coordinates of the ZMPs with respect to the centroid of the body.

S103: determining a gait planning result for the robot based on the coordinates of the zero moment points with respect to the centroid of the body.

In this embodiment, the gait planning result for the robot can be determined based on the coordinates of the zero moment points with respect to the centroid of the body which is calculated by step S102. According to the gait planning result, the walking gait of the robot can be adjusted to control the balance of the robot, so that the robot can follow the target object in the case that the robot is subjected to a force of the target object.

In this embodiment, it obtains, through the sensor set, force information of feet of the robot under a force applied by a target object; calculates coordinates of zero moment points of the feet of the robot with respect to a centroid of a body of the robot based on the force information; and determines a gait planning result for the robot based on the coordinates of the zero moment points with respect to the centroid of the body, which is capable of converting the force of the target object with respect to the robot to the zero moment points for the balance control of the robot, and using the zero moment points to perform the gait planning, so that the robot follows the target object in the case that the robot is subjected to a force of the target object.

In one embodiment, S103 may include:
comparing the coordinates of the zero moment points with respect to the centroid of the body with preset threshold vector(s) to determine a stride planning result for the robot.

In this embodiment, in order to realize the gait planning of the robot, the gait of the humanoid robot may be planned based on the actually detected ZMPs with respect to the centroid of the body, where the gait planning may include the stride planning for a forward direction and a lateral direction. In order to track the walking of the target object well, when the target object applies a larger force, the value of the ZMPs with respect to the centroid of the body will correspondingly be larger. In this case, a faster follow-up is required, that is, the step size of the robot should be increased; otherwise, a slower follow-up is required, that is, the step size of the robot should be reduced.

In this embodiment, the preset threshold vector may be obtained, and the range of the coordinates of the zero moment points with respect to the centroid of the body is determined through the preset threshold vector, and a stride value corresponding to the corresponding range is taken as the stride planning result for the robot. The stride of the walking of the robot is adjusted to the stride value corresponding to the corresponding range, thereby ensuring that the robot follows the target object in the case that the robot is subjected to a force of the target object.

In one embodiment, it can determine the stride planning result for the robot based on the coordinates of the zero moment points with respect to the centroid of the body and a preset stride piecewise function formula, where the preset stride piecewise function formula is:

$$L = \begin{cases} k_1 p_2, & p_b > p_2 \\ k_1 p_1, & p_1 < p_b < p_2 \\ 0, & -p_1 < p_b < p_1 \\ -k_1 p_1, & -p_2 < p_b < -p_1 \\ -k_1 p_2, & p_b < -p_2 \end{cases} \quad (4)$$

where, L is the stride, $p_b$ is the coordinate of the zero moment points with respect to the centroid of the body, $p_1$ and $p_2$ are the preset threshold vectors, and $p_1$ and $p_2$ are both positive numbers and $p_1 < p_2$; $k_1$ is the stride coefficient. In which, the values of preset threshold vectors $p_1$ and $p_2$ as well as the stride coefficient $k_1$ can be set according to actual needs, which are not limited herein. The adjustment of the gait planning can be realized by adjusting the preset threshold vector and the stride coefficient.

In this embodiment, the stride planning result of the robot can be adjusted through the preset stride piecewise function formula, the preset threshold vector, and the stride coefficient, so that the stride planning of the robot can be applied to different robots, different applications, and the like.

In this embodiment, it obtains, through the sensor set, force information of feet of the robot under a force applied by a target object; calculates coordinates of zero moment points of the feet of the robot with respect to a centroid of a body of the robot based on the force information; and determines a gait planning result for the robot based on the coordinates of the zero moment points with respect to the centroid of the body, which is capable of converting the force of the target object with respect to the robot to the zero moment points for the balance control of the robot, and using the zero moment points to perform the gait planning, so that the robot follows the target object in the case that the robot is subjected to a force of the target object.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
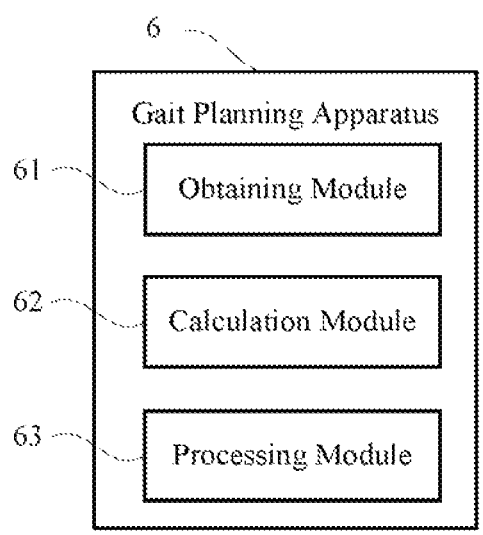
FIG. 6 is a schematic block diagram of an embodiment of a gait planning apparatus according to the present disclosure.
Figure 7:
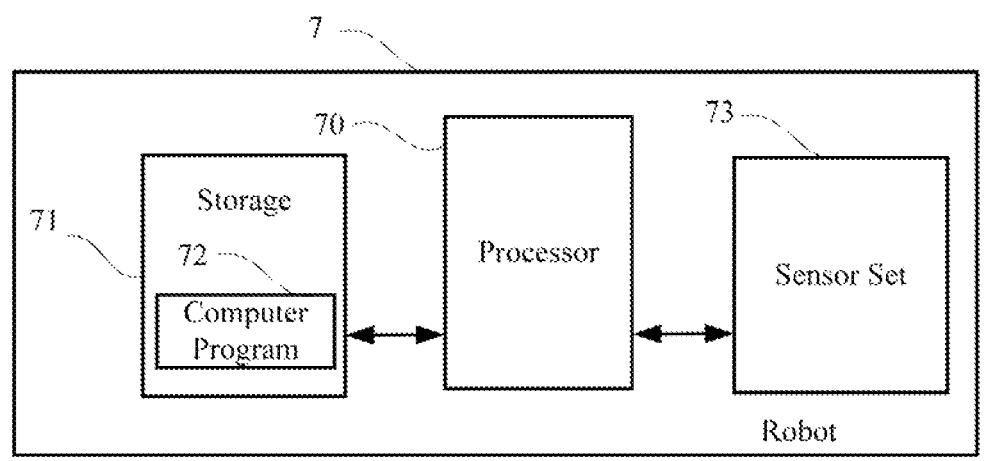
FIG. 7 is a schematic block diagram of an embodiment of a robot according to the present disclosure.

FIG. 6 is a schematic block diagram of an embodiment of a gait planning apparatus according to the present disclosure. In this embodiment, a gait planning apparatus 6 corresponding to the robot gait planning method of the forgoing embodiments which is for a robot as shown in FIG. 7 that has a sensor set is provided. For the convenience of explanation, only the parts related to this embodiment are shown. As shown in FIG. 6, the gait planning apparatus 6 includes an obtaining module 61, a calculation module 62, and a processing module 63.

The obtaining module 61 is configured to obtain, through the sensor set, force information of feet of the robot under a force applied by a target object;

The calculation module 62 is configured to calculate coordinates of zero moment points of the feet of the robot with respect to a centroid of a body of the robot based on the force information; and The processing module 63 is configured to determine a gait planning result for the robot based on the coordinates of the zero moment points with respect to the centroid of the body.

In one embodiment, the obtaining module 61 is configured to:

obtain, through a six-dimensional force sensor set of the robot, the force information of the feet of the robot under the force applied by the target object.

In one embodiment, the sensor set includes a first sensor disposed at a left foot of the robot and a second sensor disposed at a right foot of the robot; the force information includes left foot force information of the left foot and right foot force information of the right foot; the calculation module 62 is configured to:

calculate the coordinate of the zero moment point corresponding to the left foot based on a distance between the first sensor and a sole of the left foot and the left foot force information;

calculate the coordinate of the zero moment point corresponding to the right foot based on a distance between the second sensor and a sole of the right foot and the right foot force information; and calculate the coordinates of the zero moment points of the feet of the robot with respect to the centroid of the body of the robot based on relative position information of the centroid of the body and the first sensor, relative position information of the centroid of the body and the second sensor, the coordinate of the zero moment point corresponding to the left foot, and the coordinate of the zero moment point corresponding to the right foot.

In one embodiment, the calculating module 62 is configured to:

calculate the coordinate of the zero moment point corresponding to the left foot based on the distance between the first sensor and the sole of the left foot, the left foot force information, and a first formula, where the first formula is:

$$p_l = [p_{lx}\ p_{ly}\ 0]^T;$$

where, $p_l$ is the coordinate of the zero moment point corresponding to the left foot, $p_{lx} = (-\tau_{ly} - f_{lx}d_l)/f_{lz}$, $p_{ly} = (-\tau_{lx} - f_{ly}d_l)/f_{lz}$, $d_l$ is the distance between the first sensor and the sole of the left foot, $f_{lx}$, $f_{ly}$, and $f_{lz}$ are respectively the force of the directions of the three coordinate axes in the left foot force information, $\tau_{lx}$ is the torque corresponding to the direction of the x-axis in the left foot force information, and $\tau_{ly}$ is the torque corresponding to the direction of the y-axis in the left foot force information.

In one embodiment, the calculating module 62 is configured to:

calculate the coordinate of the zero moment point corresponding to the right foot based on the distance between the second sensor and the sole of the right foot, the right foot force information, and a second formula, where the second formula is:

$$p_r = [p_{rx}\ p_{ry}\ 0]^T;$$

where, $p_r$ is the coordinate of the zero moment point corresponding to the right foot, $p_{rx} = (-\tau_{ry} - f_{rx}d_r)/f_{rz}$, $p_{ry} = (-\tau_{rx} - f_{ry}d_r)/f_{rz}$, $d_r$ is the distance between the second sensor and the sole of the right foot, $f_{rx}$, $f_{ry}$, and $f_{rz}$ are respectively the force of the directions of the three coordinate axes in the right foot force information, $\tau_{rx}$ is the torque corresponding to the direction of the x-axis in the right foot force information, and is the torque corresponding to the direction of the y-axis in the right foot force information.

In one embodiment, the calculating module 62 is configured to:

calculate the coordinates of the zero moment points of the feet of the robot with respect to the centroid of the body of the robot based on the relative position information of the centroid of the body and the first sensor, the relative the position information of the centroid of the body and the second sensor, the coordinate of the zero moment point corresponding to the left foot, the coordinate of the zero moment point corresponding to the right foot, and a third formula, where the third formula is:

$$p_b = [p_{bx}\ p_{by}\ 0]^T;$$

where, $p_b$ is the coordinates of the zero moment points of the feet of the robot with respect to the centroid of the body of the robot, $$p_{bx} = \frac{(p_{rx} - l_x)f_{rz} + (p_{lx} - l_x)f_{lz}}{f_{rz} + f_{lz}},\ p_{by} = \frac{(p_{ry} - l_y)f_{rz} + (p_{ly} - l_y)f_{lz}}{f_{rz} + f_{lz}},$$

$l_l = [l_{lx}\ l_{ly}\ l_{lz}]^T$ is the relative position information of the centroid of the body and the first sensor, $l_r = [l_{rx}\ l_{ry}\ l_{rz}]^T$ is the relative the position information of the centroid of the body and the second sensor, $p_r = [p_{rx}\ p_{ry}\ 0]^T$ is the coordinate of the zero moment point corresponding to the right foot, and $p_l = [p_{lx}\ p_{ly}\ 0]^T$ is the coordinate of the zero moment point corresponding to the left foot, $f_{rz}$ is the force of the z-axis direction in the right foot force information, and $f_{lz}$ is the force of the z-axis direction in the left foot force information.

In one embodiment, the processing module 63 is configured to:

compare the coordinate of the zero moment points with respect to the centroid of the body with one or more preset threshold vectors to determine a stride planning result for the robot. Optionally, the processing module 63 is configured to:

determine the stride planning result for the robot based on the coordinates of the zero moment points with respect to the centroid of the body and a preset stride piecewise function formula, where the preset stride piecewise function formula is:

$$L = \begin{cases} k_1 p_2, & p_b > p_2 \\ k_1 p_1, & p_1 < p_b < p_2 \\ 0, & -p_1 < p_b < p_1 \\ -k_1 p_1, & -p_2 < p_b < -p_1 \\ -k_1 p_2, & p_b < -p_2 \end{cases};$$

where, L is the stride, $p_b$ is the coordinate of the zero moment points with respect to the centroid of the body, and $p_1$ and $p_2$ are the preset threshold vectors, and $p_1$ and $p_2$ are both positive numbers and $p_1 < p_2$; $k_1$ is the stride coefficient.

In this embodiment, it obtains, through the sensor set, force information of feet of the robot under a force applied by a target object; calculates coordinates of zero moment points of the feet of the robot with respect to a centroid of a body of the robot based on the force information; and determines a gait planning result for the robot based on the coordinates of the zero moment points with respect to the centroid of the body, which is capable of converting the force of the target object with respect to the robot to the zero moment points for the balance control of the robot, and using the zero moment points to perform the gait planning, so that the robot follows the target object in the case that the robot is subjected to a force of the target object.

In this embodiment, the obtaining module 61, the calculation module 62, and the processing module 63 are implemented in the form of software, which can be computer program(s) stored in a memory of the gait planning apparatus 6 and executable on a processor of the gait planning apparatus 6. In other embodiments, the obtaining module 61, the calculation module 62, and the processing module 63 may be implemented in the form of hardware (e.g., a circuit of the gait planning apparatus 6 which is coupled to the processor of the gait planning apparatus 6) or a combination of hardware and software (e.g., a circuit with a single chip microcomputer).

FIG. 7 is a schematic block diagram of an embodiment of a robot according to the present disclosure. As shown in FIG. 7, in this embodiment, the robot 7 includes a body, feet including a left foot and a right foot, a processor 70, a storage 71, a computer program 72 stored in the storage 71 and executable on the processor 70, for example, a robot gait planning program, and a sensor set 73. When executing (instructions in) the computer program 72, the processor 70 implements the steps in the above-mentioned method embodiments, for example, steps 101-103 shown in FIG. 1. Alternatively, when the processor 70 executes (instructions in) the computer program 72, the functions of each module/unit in the above-mentioned device embodiments, for example, the functions of the modules 61-63 shown in FIG. 6 are implemented. The sensor set 73 is disposed at the feet of the robot 7.

Exemplarily, the computer program 72 may be divided into one or more modules/units, and the one or more modules/units are stored in the storage 71 and executed by the processor 70 to realize the present disclosure. The one or more modules/units may be a series of computer program instruction sections capable of performing a specific function, and the instruction sections are for describing the execution process of the computer program 72 in the robot 7.

The robot 7 may be a computing device such as a desktop computer, a notebook computer, a tablet computer, and a cloud server. The robot 7 may include, but is not limited to, a processor 70 and a storage 71. It can be understood by those skilled in the art that FIG. 7 is merely an example of the robot 7 and does not constitute a limitation on the robot 7, and may include more or fewer components than those shown in the figure, or a combination of some components or different components. For example, the robot 7 may further include an input/output device, a network access device, a bus, a display, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the robot 7, for example, a hard disk or a memory of the robot 7. The storage 71 may also be an external storage device of the robot 7, for example, a plug-in hard disk, a smart media card (SMC), a secure digital (SD) card, flash card, and the like, which is equipped on the robot 7. Furthermore, the storage 71 may further include both an internal storage unit and an external storage device, of the robot 7. The storage 71 is configured to store the computer program 72 and other programs and data required by the robot 7. The storage 71 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented gait planning method comprising:
    providing a robot comprising a processor and a sensor set electrically coupled to the processor;
    obtaining, through the sensor set, force information of feet of the robot under a force applied by a target object;
    calculating, by the processor, coordinates of zero moment points of the feet of the robot with respect to a centroid of a body of the robot based on the force information;
    determining, by the processor, a gait planning result for the robot based on the coordinates of the zero moment points with respect to the centroid of the body; and
    adjusting, by the processor, a walking gait of the robot to control balance of the robot according to the gait planning result, so that the robot follows the target object when the robot is subjected to the force;
    wherein the step of determining, by the processor, the gait planning result for the robot based on the coordinates of the zero moment points with respect to the centroid of the body comprises:
    comparing, by the processor, the coordinates of the zero moment points with respect to the centroid of the body with one or more preset threshold vectors to determine a stride planning result for the robot; and
    wherein the step of comparing, by the processor, the coordinates of the zero moment points with respect to the centroid of the body with the one or more preset threshold vectors to determine the stride planning result for the robot comprises:
    determining, by the processor, the stride planning result for the robot based on the coordinates of the zero moment points with respect to the centroid of the body and a preset stride piecewise function formula, wherein the preset stride piecewise function formula is:

$$L = \begin{cases} k_1 p_2, & p_b > p_2 \\ k_1 p_1, & p_1 < p_b < p_2 \\ 0, & -p_1 < p_b < p_1 \\ -k_1 p_1, & -p_2 < p_b < -p_1 \\ -k_1 p_2, & p_b < -p_2 \end{cases} ;$$

where, L is the stride, $p_b$ is the coordinate of the zero moment points with respect to the centroid of the body, and $p_1$ and $p_2$ are the preset threshold vectors; $k_1$ is the stride coefficient.

2. The method of claim 1, wherein the sensor set includes a six-dimensional force sensor set disposed at the feet of the robots; wherein the step of obtaining, through the sensor set, the force information of the feet of the robot under the force applied by the target object comprises:
    obtaining, through the six-dimensional force sensor set, the force information of the feet of the robot under the force applied by the target object.

3. The method of claim 1, wherein the feet of the robot comprises a left foot and a right foot, the sensor set comprises a first sensor disposed at the left foot of the robot and a second sensor disposed at the right foot of the robot; the force information includes left foot force information of the left foot and right foot force information of the right foot; the step of calculating, by the processor, the coordinates of the zero moment points of the feet of the robot with respect to the centroid of the body of the robot based on the force information comprises:
    calculating, by the processor, the coordinate of t le zero moment point corresponding to the left foot based on a distance between the first sensor and a sole of the left foot and the left foot force information,
    calculating, by the processor, the coordinate of the zero moment point corresponding to the right foot based on a distance between the second sensor and a sole of the right foot and the right foot force information; and
    calculating, by the processor, the coordinates of the zero moment points of the feet of the robot with respect to the centroid of the body, of the robot based on relative position information of the centroid of the body and the first sensor, relative position information of the centroid of the body and the second sensor, the coordinate of the zero moment point corresponding to the left foot, and the coordinate of the zero moment point corresponding to the right foot.

4. The method of claim 3, wherein the step of calculating, by the processor, the coordinate of the zero moment point corresponding to the left foot based on the distance between the first sensor and the sole of the left foot and the left foot force information comprises:
calculating, by the processor, the coordinate of the zero moment point corresponding to the left foot based on the distance between the first sensor and the sole of the left foot, the left foot force information, and a first formula, wherein the first formula is:

$$p_l=[p_{lx}\ p_{ly}\ 0]^T;$$

where, $p_l$ is the coordinate of the zero moment point corresponding to the left foot, $p_{lx}=(-\tau_{ly}-f_{lx}d_l)/f_{lz}$, $p_{ly}=(-\tau_{lx}-f_{ly}d_l)/f_{lz}$, $d_l$ is the distance between first sensor and the sole of the left foot, $f_{lx}$, $f_{ly}$, and $f_{lz}$ are respectively the force of the directions of the three coordinate axes in the left foot force information, $\tau_{lx}$ is the torque corresponding to the direction of the x-axis in the left foot force information, and $\tau_{ly}$ is the torque corresponding to the direction of the y-axis in the left foot force information.

5. The method of claim 3, wherein the step of calculating, by the processor, the coordinate of the zero moment point corresponding to the right foot based on the distance between the second sensor and the sole of the right foot and the right foot force information comprises:
calculating, by the processor, the coordinate of the zero moment point corresponding to the right foot based on the distance between the second sensor and the sole of the right foot, the right foot force information, and a second formula, wherein the second formula is:

$$p_r=[p_{rx}\ p_{ry}\ 0]^T;$$

where, $p_r$ is the coordinate of the zero mon ent point corresponding to the right foot, $p_{rx}=(-\tau_{ry}-f_{rx}d_r)/f_{rz}$, $p_{ry}=(-\tau_{rx}-f_{ry}d_r)/f_{rz}$, $d_r$ is the ry rz distance between the second sensor and the sole of the right foot, $f_{rx}$, $f_{ry}$, and $f_{rz}$ are respectively the force of the directions of the three coordinate axes in the right foot force information, $\tau_{rx}$ is the torque corresponding to the direction of the x-axis in the right foot force information, and $\tau_{ry}$ is the torque corresponding to the direction of the y-axis in the right foot force information.

6. The method of claim 3, wherein the step of calculating, by the processor, the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding to the left foot, and the coordinate of the zero moment point corresponding to the right foot comprises:
calculating, by the processor, the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding to the left foot, the coordinate of the zero moment point corresponding to the right foot, and a third formula, wherein the third formula is:

$$p_b=[p_{bx}\ p_{by}\ 0]^T,$$

where, $p_b$ is the coordinates of the zero moment points of the et of the robot with respect to the centroid of the body of the robot, $$p_{bx}=\frac{(p_{rx}-l_x)f_{rz}+(p_{lx}-l_x)f_{lz}}{f_{rz}+f_{lz}},\ p_{by}=\frac{(p_{ry}-l_y)f_{rz}+(p_{ly}-l_y)f_{lz}}{f_{rz}+f_{lz}},$$

$l_l=[l_{lx}\ l_{ly}\ l_{lz}]^T$ is the relative position information of the centroid of the body and the first sensor, $l_r=[l_{rx}\ l_{ry}\ l_{rz}]^T$ is the relative position information of the centroid of the body and the second sensor, $p_r=[p_{rx}\ p_{ry}\ 0]^T$ or is the coordinate of the zero moment point corresponding to the right foot, and $p_l=[p_{lx}\ p_{ly}\ 0]^T$ is the coordinate of the zero moment point corresponding to the left foot, $f_{rz}$ is the force of the z-axis direction in the right foot force information, and $f_{lz}$ is the force of the z-axis direction in the left foot force information.

7. A robot comprising:
a body;
feet comprising a left foot and a right foot;
a sensor set;
a memory:
a processor, and
one or more computer programs stored in the memory and executable on the processor, wherein the one or more computer programs comprise:
instructions for obtaining, through the sensor set, force information of the feet of the robot under a force applied by a target object;
instructions for calculating coordinates of zero moment points of the feet of the robot with respect to a centroid of the body of the robot based on the force information; and
instructions for determining a gait planning result for the robot based on the coordinates of the zero moment points with respect to the centroid of the body;
wherein the instructions for determining the gait planning result for the robot based on the coordinates of the zero moment points with respect to the centroid of the body comprise:
instructions for comparing the coordinates of the zero moment points with respect to the centroid of the body with one or more preset threshold vectors to determine a stride planning result for the robot;
wherein the instructions for comparing the coordinates of the zero moment points with respect to the centroid of the body with the one or more preset threshold vectors to determine the stride planning result for the robot comprise:
instructions for determine the stride planning result for the robot based on the coordinates of the zero moment points with respect to the centroid of the body and a preset stride piecewise function formula, wherein the preset stride piecewise function formula is:

$$L=\begin{cases}k_1p_2, & p_b>p_2\\k_1p_1, & p_1<p_b<p_2\\0, & -p_1<p_b<p_1\\-k_1p_1, & -p_2<p_b<-p_1\\-k_1p_2, & p_b<-p_2\end{cases};$$

where, L is the stride, $p_b$ is the coordinate of the zero moment points with respect to the centroid of the body, and $p_1$ and $p_2$ are the preset threshold vectors; $k_1$ is the stride coefficient.

8. The robot of claim 7, wherein the sensor set includes a six-dimensional force sensor set disposed at the feet of the robot; wherein the instructions for obtaining, through the sensor set, the force information of the feet of the robot under the force applied by the target object comprise:

instructions for obtaining, through the six-dimensional force sensor set, the force information of the feet of the robot under the force applied by the target object.

9. The robot of claim 7, wherein the sensor set comprises a first sensor disposed at the left foot of the robot and a second sensor disposed at the right foot of the robot; the force information includes left toot force information of the left foot and right foot force information of the right foot; wherein the instructions for calculating the coordinates of the zero moment points of the feet of the robot with respect to the centroid of the body of the robot based on the force information comprise:

instructions for calculating the coordinate of the zero moment point corresponding to the left foot based on a distance between the first sensor and a sole of the left foot and the left foot force information;

instructions for calculating the coordinate of the zero moment point corresponding to the right foot based on a distance between the second sensor and a sole of the right foot and the right foot force information; and instructions for calculating the coordinates of the zero moment points of the feet of the robot with respect to the cent-raid of the body of the robot based on relative position information of the centroid of the body and the first sensor, relative position information of the centroid of the body and the second sensor, the coordinate of the zero moment point corresponding to the left foot, and the coordinate of the zero moment point corresponding to the right foot.

10. The robot of claim 9, wherein the instructions for calculating the coordinate of the zero moment point corresponding to the left foot based on the distance between the first sensor and the sole of the left foot and the left foot force information comprise;

instructions for calculating the coordinate of the zero moment point corresponding to the left foot based on the distance between the first sensor and the sole of the left foot, the left foot force information, and a first formula, wherein the first formula is:

$$p_l = [p_{lx} \, p_{ly} \, 0]^T;$$

where, $p_l$ is the coordinate of the zero moment point corresponding to the left foot, $p_{lx} = (-\tau_{ly} - f_{lx} d_l)/f_{lz}$, $p_{ly} = (-\tau_{lx} - f_{ly} d_l)/f_{lz}$, $d_l$ is the distance between the first sensor and the sole of the left foot, $f_{lx}$, $f_{ly}$, and $f_{lz}$ are respectively the force of the directions of the three coordinate axes in the left foot force information, $\tau_{lx}$ is the torque corresponding to the direction of the x-axis in the left foot force information, $\tau_{ly}$ and is the torque corresponding to the direction of the y-axis in the left foot force information.

11. The robot of claim 9, wherein the instructions for calculating the coordinate of the zero moment point corresponding to the right foot based on the distance between the second sensor and the sole of the right foot and the right foot force information comprise:

instructions for calculating the coordinate of the zero moment point corresponding to the right foot based on the distance between the second sensor and the sole of the right foot, the right foot force information, and a second formula, wherein the second formula is:

$$p_r = [p_{rx} \, p_{ry} \, 0]^T;$$

where, $p_r$ is the coordinate of the zero moment point corresponding to the right foot, $p_{rx} = (-\tau_{ry} - f_{rx} d_r)/f_{rz}$, $p_{ry} = (-\tau_{rx} - f_{ry} d_r)/f_{rz}$, $d_r$ is the distance between the second sensor and the sole of the right foot, $f_{rx}$, $f_{ry}$, and $f_{rz}$ are respectively the force of the directions of the three coordinate axes in the right foot force information, $\tau_{rx}$ is the torque corresponding to the direction of the x-axis in the right foot force information, and $\tau_{ry}$ is the torque corresponding the direction of the y-axis in the right foot force information.

12. The robot of claim 9, wherein the instructions for calculating the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding to the left foot, and the coordinate of the zero moment point corresponding to the right foot comprise:

instructions for calculating the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding to the left foot, the coordinate of the zero moment point corresponding to the right foot, and a third formula, wherein the third formula is, $$p_b = [p_{bx} \, p_{by} \, 0]^T;$$

where, $p_b$ is the coordinates of the zero moment points of the feet of the robot with respect to the centroid of the body of the robot, $$p_{bx} = \frac{(p_{rx} - l_x)f_{rz} + (p_{lx} - l_x)f_{lz}}{f_{rz} + f_{lz}}, \, p_{by} = \frac{(p_{ry} - l_y)f_{rz} + (p_{ly} - l_y)f_{lz}}{f_{rz} + f_{lz}},$$

$l_l = [l_{lx} \, l_{ly} \, \text{is} \, l_{lz}]^T$ the relative position information of the centroid of the body and the first sensor, $l_r = [l_{rx} \, l_{ry} \, l_{rz}]^T$ is the relative position information of the centroid of the body and the second sensor, $p_r [p_{rx} \, p_{ry} \, 0]^T$ is the coordinate of the zero moment point corresponding to the right foot, and $p_l = [p_{lx} \, p_{ly} \, 0]^T$ or is the coordinate of the zero moment point corresponding to the left foot, $f_{rz}$ is the force of the z-axis direction in the right foot force information, and $f_{lz}$ is the force of the z-axis direction in the left foot force information.

13. A non-transitory computer-readable storage medium for storing one or more computer programs executable by a processor, wherein the one or more computer programs comprise:

instructions for obtaining, through a sensor set of a robot, force information of feet of the robot under a force applied by a target object;

instructions for calculating coordinates of zero moment points of the feet of the robot with respect to a centroid of a body of the robot based on the force information; and instructions for determining a gait planning result for the robot based on the coordinates of the zero moment points with respect to the centroid of the body;

wherein the instructions for determining the gait planning result for the robot based on the coordinates of the zero moment points with respect to the centroid of the body comprise:

instructions for comparing the coordinates of the zero moment points with respect to the centroid of the body with one or more preset threshold vectors to determine a stride planning result for the robot;

wherein the instructions for comparing the coordinates of the zero moment points with respect to the centroid of the body with the one or more preset threshold vectors to determine the stride planning result for the robot comprise:

instructions for determine the stride planning result for the robot based on the coordinates of the zero moment points with respect to the centroid of the body and a preset stride: piecewise function formula, wherein the preset stride piecewise function formula is:

$$L = \begin{cases} k_1 p_2, & p_b > p_2 \\ k_1 p_1, & p_1 < p_b < p_2 \\ 0, & -p_1 < p_b < p_1 \\ -k_1 p_1, & -p_2 < p_b < p_1 \\ -k_1 p_2, & p_b < -p_2 \end{cases};$$

where, L is the stride, $p_b$ is the coordinate of the zero moment points with respect to the centroid of the body, and $p_1$ and $p_2$ are the preset threshold vectors; $k_1$ is the stride coefficient.

14. The non-transitory computer-readable storage medium of claim 13, wherein the sensor set includes a six-dimensional force sensor set disposed at the feet of the robot; wherein the instructions for obtaining, through the sensor set, the force information of the feet of the robot under the force applied by the target object comprise:

instructions for obtaining, through the six-dimensional force sensor set, the force information of the feet of the robot under the force applied by the target object.

15. The non-transitory computer-readable storage medium of claim 13, wherein the feet of the robot comprises a left foot and a right foot, the sensor set comprises a first sensor disposed at the left foot of the robot and a second sensor disposed at the right foot of the robot; the force information includes left foot force information of the left foot and right foot force information of the right foot; wherein the instructions for calculating the coordinates of the zero moment points of the feet of the robot with respect to the centroid of the body of the robot based on the force information comprise:

instructions for calculating the coordinate of the zero moment point corresponding to the left foot based on a distance between the first sensor and a sole of the left foot and the left foot force information;

instructions for calculating the coordinate of the zero moment point corresponding to the right foot based on a distance between the second sensor and a sole of the right foot and the right foot force information; and instructions for calculating the coordinates of the zero moment points of the feet of the robot with respect to the centroid of the body of the robot based on relative position information of the centroid of the body and the first sensor, relative position information of the centroid of the body and the second sensor, the coordinate of the zero moment point corresponding to the left foot, and the coordinate of the zero moment point corresponding to the right foot.

16. The non-transitory, computer-readable storage medium of claim 15, wherein the instructions for calculating the coordinate of the zero moment point corresponding to the left foot based on the distance between the first sensor and the sole of the left foot and the left foot force information comprise:

instructions for calculating the coordinate of the zero moment point corresponding to the left foot based on the distance between the first sensor and the sole of the left foot, the left foot force information, and a first formula, wherein the first formula is:

$$p_l = [p_{lx}\ p_{ly}\ 0]^T;$$

where, $p_l$ is the coordinate of the zero moment point corresponding to the left foot, $p_{lx} = (-\tau_{ly} - f_{lx} d_l)/f_{lz}$, $p_{ly} = (-\tau_{lx} - f_{ly} d_l)/f_{lz}$, $d_l$ is the distance between the first sensor and the sole of the left foot, $f_{lx}$, $f_{ly}$ and $f_{lz}$ are respectively the force of the directions of the three coordinate axes in the left foot force information, $\tau_{lx}$ is the torque corresponding to the direction of the x-axis in the left foot force information, and $\tau_{ly}$ is the torque corresponding to the direction of the y-axis in the left foot force information.

17. The non-transitory computer-readable storage medium of claim 15, wherein the instructions for calculating the coordinate of the zero moment point corresponding to the right foot based on the distance between the second sensor and the sole of the right foot and the right foot force information comprise:

instructions for calculating the coordinate of the zero moment point corresponding to the right foot based on the distance between the second sensor and the sole of the right foot, the right foot force information, and a second formula, wherein the second formula is:

$$p_r = [p_{rx}\ p_{ry}\ 0]^T;$$

where, $p_r$ is the coordinate of the zero moment point corresponding to the right foot, $p_{rx} = (-\tau_{ry} - f_{rx} d_r)/f_{rz}$, $p_{ry} = (-\tau_{rx} - f_{ry} d_r)/f_{rz}$, $d_r$ is the distance between the second sensor and the sole of the right foot, $f_{rx}$, $f_{ry}$, and $f_{rz}$ are respectively the force of the directions of the three coordinate axes in the right foot force information, $\tau_{rx}$ is the torque corresponding to the direction of the x-axis in the right foot force information, and $\tau_{ry}$ is the torque corresponding to le direction of the y-axis in the right foot force information.

18. The non-transitory computer-readable storage medium of claim 15, wherein the instructions for calculating the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding to the left foot, and the coordinate of the zero moment point corresponding, to the right foot comprise:

instructions for calculating the coordinates of the zero moment points of the feet of the robot with respect to the centroid of the body of the robot based on the relative position information of the centroid of the body and the first sensor, the relative position information of the centroid of the body and the second sensor, the coordinate of the zero moment point corresponding, to the left foot, the coordinate of the zero moment point corresponding to the right foot, and a third formula, wherein the third formula is:

$$p_b = [p_{bx}\ p_{by}\ 0]^T;$$

where, $p_b$ is the coordinates of the zero moment points of the feet of the robot with respect to the centroid of the body of the robot, $$p_{bx} = \frac{(p_{rx}-l_x)f_{rz}+(p_{lx}-l_x)f_{lz}}{f_{rz}+f_{lz}}, \quad p_{by} = \frac{(p_{ry}-l_y)f_{rz}+(p_{ly}-l_y)f_{lz}}{f_{rz}+f_{lz}},$$

$l_l=[l_{lx}\ l_{ly}\ l_{lz}]^T$ is the relative position information of the centroid of the body and the first sensor, $l_r=[l_{rx}\ l_{ry}\ l_{rz}]^T$ is the relative position information of the centroid of the body and the second sensor, $p_r=[p_{rx}\ p_{ry}\ 0]^T$ is the coordinate of the zero moment point corresponding to the right foot, and $p_l=[p_{lx}\ p_{ly}\ 0]^T$ is the coordinate of the zero moment point corresponding to the left foot, Z is the force of the z-axis direction in the right foot force information, and $f_{lz}$ is the force of the z-axis direction in the left foot force information.

* * * * *